United States Patent
Sullivan

Patent Number: 5,406,405
Date of Patent: Apr. 11, 1995

[54] ROTATING KINEMATIC OPTIC MOUNT

[76] Inventor: Mark T. Sullivan, 1661 18th Ave., San Francisco, Calif. 94122

[21] Appl. No.: 800,579

[22] Filed: Nov. 27, 1991

[51] Int. Cl.⁶ .................... G02B 26/08; G02B 7/18
[52] U.S. Cl. ................... 359/223; 359/224; 359/226; 359/555; 359/872
[58] Field of Search ............... 359/197, 223, 225, 226, 359/850, 872, 873, 874, 198, 199, 200, 212, 819, 196, 821, 822, 823, 824, 554, 555, 556

[56] References Cited

U.S. PATENT DOCUMENTS

| | | | |
|---|---|---|---|
| 3,891,299 | 6/1975 | Rushing | 359/223 |
| 3,928,778 | 12/1975 | Ivanov et al. | 359/872 |
| 3,936,193 | 2/1976 | Auth | 359/872 |
| 4,171,876 | 10/1979 | Wood | 359/872 |
| 4,290,574 | 9/1981 | Archibald | 248/177 |
| 4,406,525 | 9/1983 | Itoh et al. | 359/226 |
| 4,678,289 | 7/1987 | Mattelin et al. | 359/226 |
| 4,723,075 | 2/1988 | Gorman | 359/872 |
| 4,763,991 | 8/1988 | Klotz, Jr. | 359/872 |
| 4,771,545 | 9/1988 | Hisayasu et al. | 33/299 |
| 4,842,397 | 6/1989 | Eisler | 350/634 |
| 4,929,073 | 5/1990 | LaPlante et al. | 350/609 |

FOREIGN PATENT DOCUMENTS

| | | | |
|---|---|---|---|
| 1547224 | 1/1970 | Germany | 359/872 |
| 3837770 | 5/1989 | Germany | 359/871 |
| 3901848 | 11/1989 | Germany | 359/872 |
| 0261319 | 10/1988 | Japan | 359/872 |
| 1286458 | 8/1972 | United Kingdom | 359/872 |

OTHER PUBLICATIONS

Indexing system for optical beam steering Sullivan, et al., Published Nov. 28, 1990, pp. 361-372.
The Scientific Papers of James Clerk; Maxwell, vol. 2, Niven, Dover Pubs., pp. 506-508.

*Primary Examiner*—Ricky D. Shafer
*Attorney, Agent, or Firm*—Skjerven, Morrill, MacPherson, Franklin & Friel

[57] ABSTRACT

A Rotating Kinematic Mount having a rotating mirror or other optics precisely positioned so as to direct light or other energy to a number of measuring devices. The mount uses a rotating turret containing one or more tilted optical elements. The turret is raised from a base, rotated by stepper motors and then lowered into a new alignment, An arrangement of balls and grooves establishes positioning of the turret in a kinematic mount, thus achieving the precise rearrangement of optical elements relative to a central axis and the redirection of the energy beam onto the sensing devices.

7 Claims, 2 Drawing Sheets

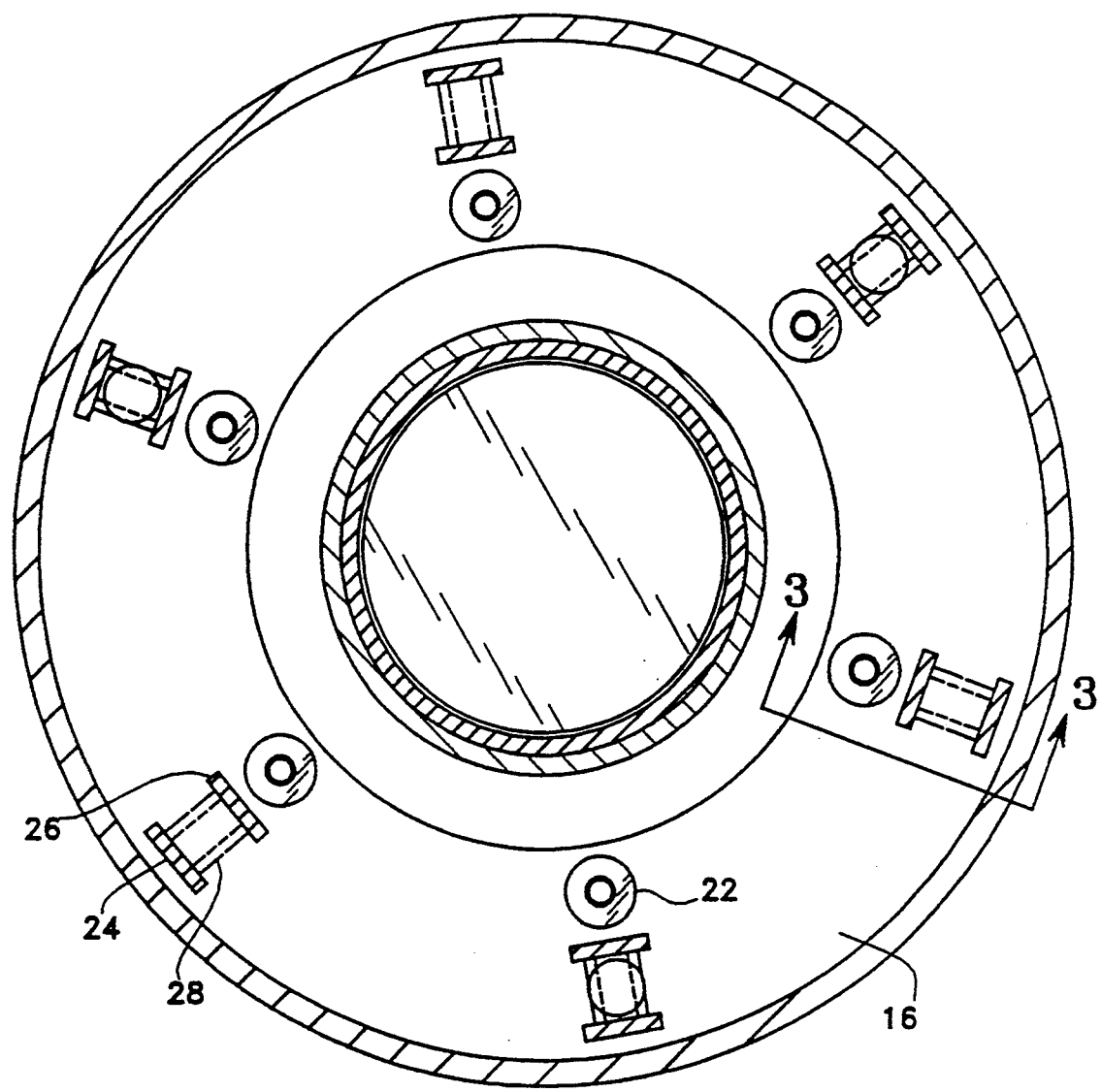
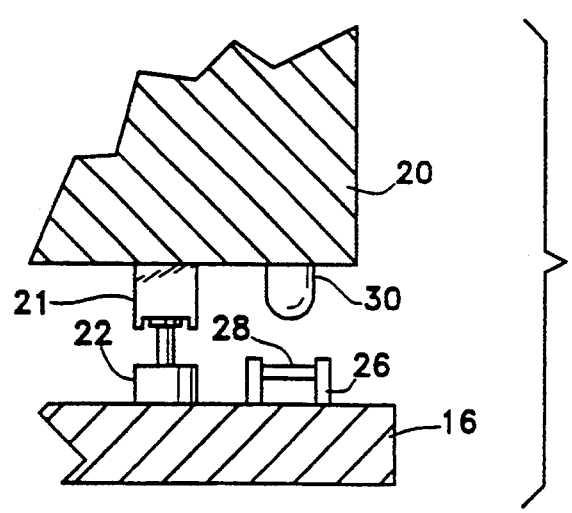
Fig. 2
Fig. 3

ROTATING KINEMATIC OPTIC MOUNT

BACKGROUND OF THE INVENTION

1. Field of the Invention

The present invention relates to a precision, multi-positional mounting system for optics, using kinematic principles to achieve rapid and precise location of the optical elements.

2. Description of Related art

The use of kinematic principles in the precise positioning of optical instruments by means of six points of contact restraining activity in all six degrees of freedom of motion is well known by those versed in the art. However, previous attempts at producing an ultra-precise mounting able to rapidly shift between a plurality of positions have stressed the use of high-precision, machined components combined with electromechanical or detent means to achieve the proper positioning.

The cost of manufacture of the high-precision components is an adverse factor. The additional weight and complexity of the parts leads also to wear and reliability problems. When placed in a hostile environment, such as that encountered in non-terrestrial applications, simplicity, low-mass and high dependability are clearly desirable characteristics.

SUMMARY OF THE INVENTION

The present invention overcomes the problems noted above by providing a simple six-point mount, placed according to kinematic principles, for each desired position of the optic. In the preferred embodiment, a rigid annular base plate, attached to the main body of the optical instrument is fitted with vee-shaped grooves, each radiating from the central axis and situated approximately 120 degrees apart from its two companion grooves. A second rigid, annular plate, placed above, parallel to and on a common axis with the first plate, is provided with protuberances with hemispherical ends, in such a manner that the protuberances each come into a two point contact with the corresponding vee. A turret containing one or more optical elements, tilted at an appropriate angle, is attached to the second annular plate.

In this configuration, the second plate will be held in a precise and repeatable position. If the second plate is raised a short distance, the protuberances disengage and the plate may be rotated to the next desired position through one of a variety of means, the preferred embodiment using a stepper motor. The second position may necessitate the presence of a separate triad of grooves, or if situated 120 degrees from a previous position, it may use the existing grooves. When the two plates are then brought together, the hemispheres and vees will engage, providing a precise six point kinematic mount for the optic in the new position. If the optic is a dichroic mirror, fixed in the second plate at an angle, light striking the mirror may be directed to different instruments arranged radially around the main framework and on the main axis.

A number of advantages arise from the invention. Compared with other devices addressing the problem, the invention uses comparatively few parts, and friction is reduced due to the small number of moving parts. The use of a true kinematic mount results in great accuracy in placement with minimal wear of the bearing surfaces. The claimed invention derives a significant benefit through the separation of the rotating means, which need only achieve a gross positioning of the rotating plate with the extreme accuracy of a true kinematic mounting. Note that once the rotating means has achieved its rough positioning of the rotating plate, the kinematic mounting mechanism need only achieve a slight translation in order to reach the precise position desired.

The raising and lowering of the rotating plate may be accomplished by a variety of mechanical or electrical means, including but not limited to a motor or a linear actuator. In a zero gravity application, the lowering of the plate may be easily accomplished through the use of return springs. In the preferred embodiment, the distal ends of the linear actuators may, when extended, rest in grooves in a circumferential track placed upon the inferior surface of the rotating plate to facilitate movement of the rotating plate. The raising and lowering movement need only be enough to disengage the kinematic mount. Note that the disengagement may be accomplished by rotating the rotating disk using sufficient force. Where exotic materials are used, material may be conserved due to the relay small bearing surfaces.

BRIEF DESCRIPTION OF DRAWINGS

FIG. 2 shows a schematic top view of the invention at the level of the kinematic mount, showing the positioning of the elements forming the kinematic mount in the preferred embodiment.

FIG. 3 shows a detail cross section of the invention, demonstrating the relative position of the ball and vee elements when disengaged. The positioning of a linear actuator is shown retracted, with the track shown above.

DETAILED DESCRIPTION OF THE INVENTION

Figure 1:
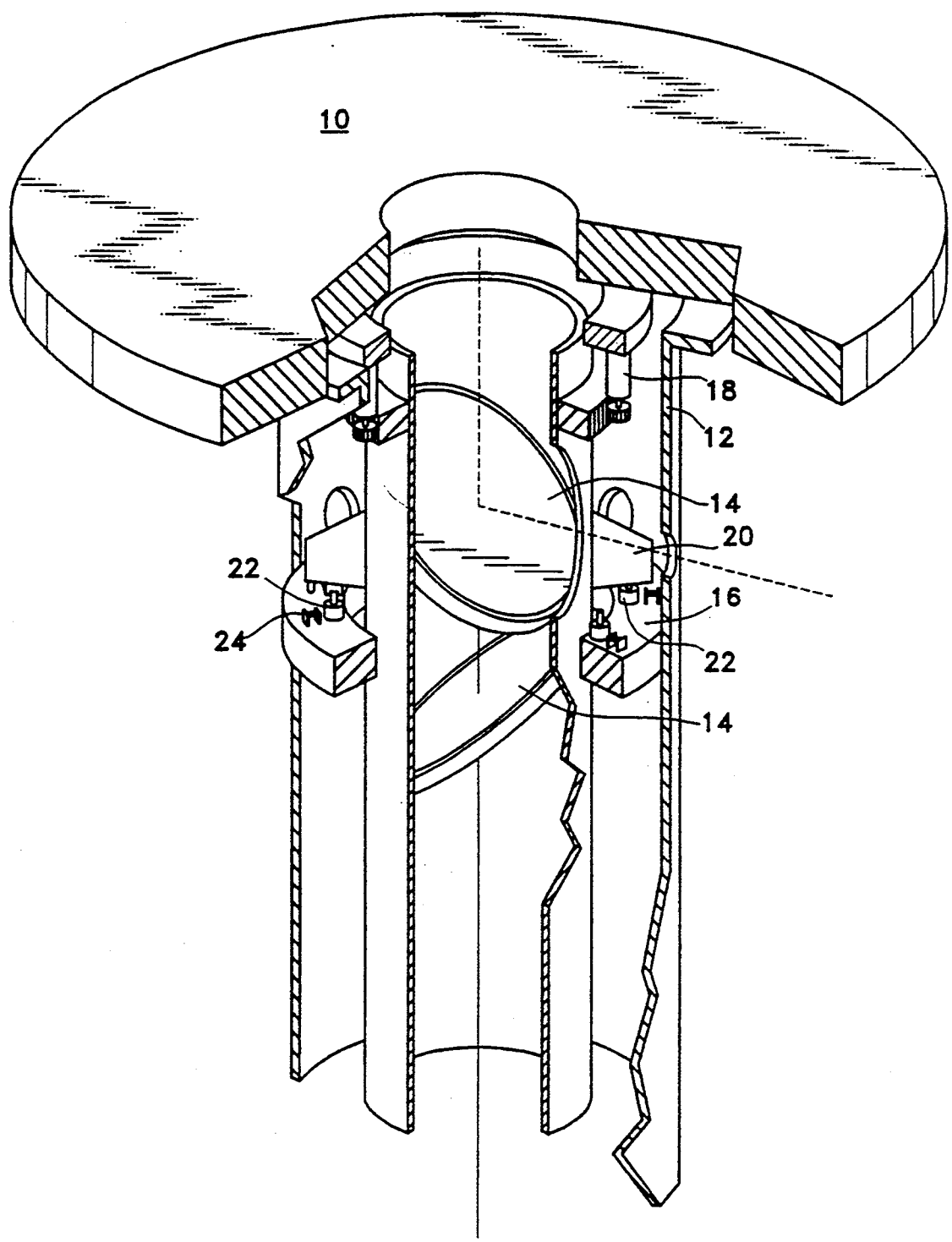
FIG. 1 shows a schematic side view of the invention, displaying the interrelationship between the optic holding rotating plate and turret assembly, the rotational means and the stationary plate and housing assembly.

As illustrated in FIG. 1, a rotating kinematic mount assembly 10 includes a housing 12, placed about one or more optical elements 14, in this case, a mirror, a compensator and one or more sensors arrayed radially around the housing central axis, as well as on the central axis.

Attached to the housing 12 is an annular, fixed first plate 16. Also attached to the housing 12 are one or more stepper motors 18 or similar means for rotating an annular second plate turret assembly 20. Further attached to the housing 12 is a means for achieving sufficient movement of the rotating plate 20 away from the fixed plate 16 such as to achieve disengagement of the kinematic mount. In the preferred embodiment, the means for achieving disengagement is one or more linear actuators 22 which engage with a track 21 on the inferior surface of the rotating plate 20.

The details of the kinematic mount are displayed in FIGS. 2 and 3. Attached to the superior surface of the first plate 16 are a plurality of "vees" 24. A vee 24 may be comprised of a plates 26 and parallel rods 28 assembly as shown in FIG. 2, a vee shaped notch cut into the material of the plate 16, or preferably, a post with vee shaped notch.

A plurality of posts or balls 30 with hemispherical distal ends (hereinafter called "balls") are arrayed on the inferior surface of the rotating plate 20.

Suspension of the rotating plate 20 and its turret assembly from the walls of the housing is accomplished by the use of bearings, bushings or tangential flexure rods.

In the preferred embodiment, the vees 24 will be formed by cutting the vee 24 into a post of material of suitable hardness which is then attached to the appropriate baseplate. In a like manner, the balls 30 are formed out of suitably hardened material and then attached to the appropriate plate.

Note that the placement of the vees 24 on the superior surface of the fixed plate 16 and that of the balls 30 on the inferior surface of the rotating plate 20 may be reversed.

Although the use of a kinematic mount consisting of three pairs of balls 30 and vees 24 is disclosed as the preferred embodiment of the invention, other configurations of kinematic mountings may be used, such as the use of the combination of a plane, a vee and a tetrahedral depression having a triangular cross section. In that embodiment, the plane provides one point of contact, the vee, two and the tetrahedral depression, three points of contact. In clarification, the tetrahedral depression is so named because three sides are present within the surface of the mount and the fourth side is represented by the plane of the plate surface.

What is claimed is:

1. A multi-positional optic mount, comprising:
   a housing;
   a first plate rigidly attached to said housing;
   a second plate attached rotatably to said housing and adjacent said first plate;
   at least one optical element attached to said second plate;
   means for separating and reapproximating said first and second plates;
   means for rotating said second plate with respect to the first plate; and
   means for providing contact between said first plate and said second plate, said means for providing contact being configured such that there are six and only six points of contact between said first plate and said second plate, said six points of contact constraining said second plate at a precise, repeatable position with respect to said first plate.

2. A multi-positional optic mount as in claim 1 wherein the means for rotating the second plate comprises one or more stepper motors.

3. A multi-positional optic mount as in claim 2 wherein the means for separating and reapproximating said first and second plates comprises one or more linear actuators.

4. A multi-positional optic mount as in claim 1 wherein said means for providing contact comprises a plurality of balls placed on a surface of one of said plates and a tetrahedral depression, a vee and a plane placed on the other of said plates.

5. A multi-positional optic mount as in claim 1 wherein said means for providing contact comprises a plurality of vees placed radially on a surface of one of said plates and a plurality of balls placed on a surface of the other of said plates.

6. A multi-positional optic mount as in claim 5 wherein said balls are situated on an inferior surface of said second plate and said vees are situated on a superior surface of said first plate.

7. A multi-positional optic mount as in claim 1 wherein said optical element is mounted on a turret, said turret being attached to said second plate.

* * * * *